Aug. 18, 1959                C. S. MORRISON                2,900,034
                        IMPLEMENT MOUNTING MEANS
Filed Jan. 7, 1957                                        2 Sheets-Sheet 1

INVENTOR.
C. S. MORRISON
BY
ATTORNEYS

Aug. 18, 1959    C. S. MORRISON    2,900,034
IMPLEMENT MOUNTING MEANS
Filed Jan. 7, 1957    2 Sheets-Sheet 2

INVENTOR.
C. S. MORRISON

BY
ATTORNEY

United States Patent Office 2,900,034
Patented Aug. 18, 1959

2,900,034

IMPLEMENT MOUNTING MEANS

Charles S. Morrison, Moline, Ill., assignor, by mesne assignments, to Deere & Company, a corporation of Delaware Application January 7, 1957, Serial No. 632,699

3 Claims. (Cl. 172—273)

This invention relates to a farm implement of the type to be mounted on a tractor. More particularly this refers to an improvement on a tractor-mounted cultivator.

Typical of the present day tractor-mounted cultivator is that shown in U.S. Patent 2,423,148, issued to T. W. Johnson. In this type of cultivator there is normally provided vertical pivot means at the forward end of the tractor body. Structures carrying the left- and right-hand sections of a cultivator are connected to the pivot means and extend rearwardly and outwardly from the pivot means to opposite sides of the tractor body. Conventionally there is provided a connection between the structures carrying the cultivator sections and the tractor body at a distance spaced fore-and-aft from the pivot means. Consequently the cultivator is mounted by structure at the forward end of a tractor and also by structure at the side of the tractor. In mounting the cultivator on a tractor, the shovels on the cultivator are locked in a position where they engage the ground and the cultivator sections are outwardly of the forward pivots in a position permitting a forward moving tractor body and particularly the front wheels of the tractor to move between the sections of the cultivator. Upon the front end of the forward moving tractor contacting the structure supporting the vertical pivot means the cultivator sections will swing inwardly. The structure supporting the vertical pivot means is then connected to the tractor and the connections between the sections and the tractor body are made. In dismounting the cultivator sections from the tractor, the sections are first swung outwardly from the tractor body and the tractor is then backed from between the sections. The necessity of having the cultivator sections outward of the tractor body prior to both mounting and dismounting the sections is that in normal operation of the cultivator, there will be provided a pair of shovels directly rearwardly of the front wheels of the tractor (assuming for the time being that this is a tricycle type tractor) which obviously would interfere with the tractor wheels should mounting or dismounting occur prior to the sections being moved.

Movement of the cultivator sections outwardly of the tractor body has in the past been done manually. In the past the use of a two- or four-row cultivator was common, and also due to the limited power and load carrying capacities of the tractors, the cultivators were necessarily light and could be swung on the forward vertical pivots without too much difficulty or strain on the operator. However, with the advent of the larger tractors and with the continued emphasis on large scale farming, cultivators are structurally built to withstand deeper penetration and six row cultivators of this type are becoming more and more common place with even larger cultivators being contemplated. The combination of these two factors have therefore increased the overall weight of the cultivator sections so that it is difficult if not impossible for one man to move the sections laterally to be attached or detached from the tractor body. Consequently it is becoming more and more apparent that the power source on the tractor is or will be required to move the sections.

It is therefore the primary object of this invention to provide attachment means for mounting the cultivator sections on the tractor which will not require manual labor in attaching or detaching the sections and which will use the power of the tractor for moving the sections both inwardly and outwardly relative to the tractor.

It is also an object of this invention in the above contemplated attachment structure to provide a simple device which will restrict or limit rearward movement of the tractor relative to the forward pivot means until the cultivator sections have been driven spacedly outward from the sides of the tractor and clear of the front wheels.

Generally it will be the purpose of the invention to provide means for connecting the vertical pivot means to the forward end of the tractor which includes a latch. The latch may be operated from the operator's station on the tractor. By detaching all other connecting means between the cultivator and the tractor other than the means connecting the vertical pivot means, rearward movement of the tractor will utilize the resistance of the cultivator shovels to fore-and-aft movement to cause the shovels to swing outwardly on the forward pivot means. Upon the cultivator sections swinging clear, the operator may then operate the latch to permit separation of the cultivator from the tractor, and the tractor may then continue rearwardly.

Other objects and advantages of the present invention will become apparent to those skilled in the art as the nature of the invention is better understood from the following detailed description as shown in the accompanying drawings.

Figure 1:
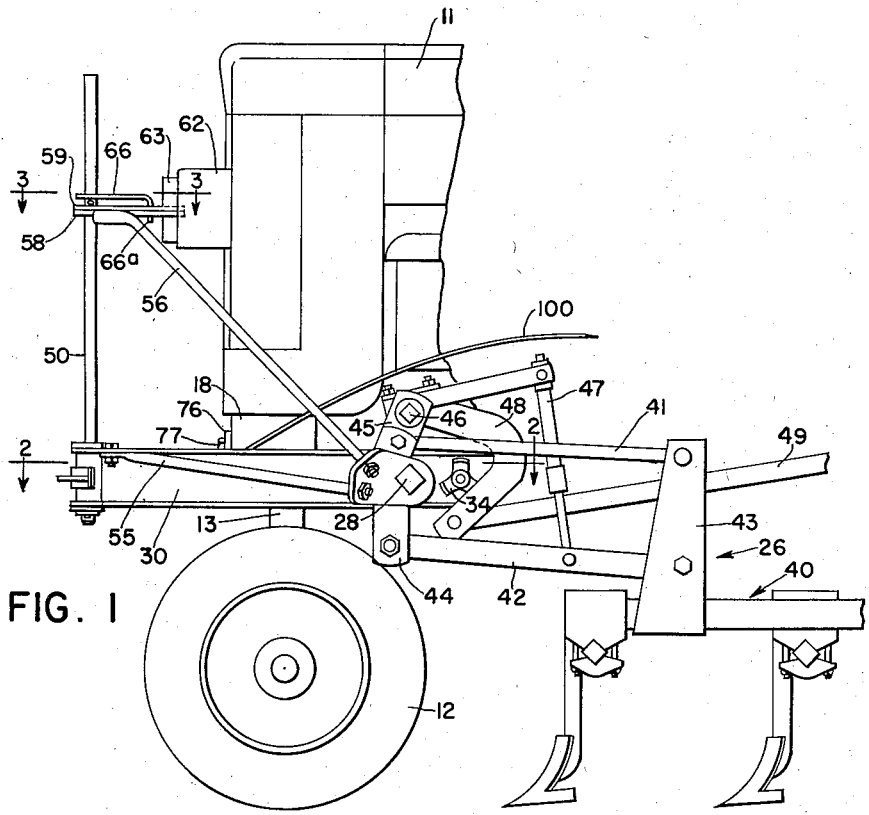
Fig. 1 is a side elevation of the forward portion of a tractor with a cultivator mounted thereon.

The tractor herein shown is of the tricycle type, having a fore-and-aft elongated body 11 supported at its forward end by a wheel assembly, indicated in its entirety by the reference numeral 12 and at its rear by a pair of transversely spaced apart rear traction wheels, not shown. A conventional steering column 13 is provided between the tractor body 11 and the wheel assembly 12 for the purpose of permitting the tractor to be guided over the fields. The tractor body is characterized by having a pair of left and right hand structural frames 14, 15 (Fig. 2) running lengthwise and on opposite sides of the tractor. The frames 14, 15 may be an integral part of the tractor frame or may be attached to the tractor. For purposes of the present invention the structural frames 14 and 15 are shown as attachments and are connected to the body of the tractor frame by means of the cross brace 16, suitable apertures being provided to receive connecting bolts 22. Surrounding the steering column 13 is a rigid housing block 18, details of which are unimportant other than that the block has an upright front face 19. The cultivator is composed of left and right sections 26, 27 positioned respectively to the left and right of the tractor body 11. The right section is shown only partially in Fig. 2, being indicated by a tool bar 29. The right section 27 is identical to the left section 26 and consequently further detailed description is unwarranted inasmuch as such will be presented relative to the left section 26. The section 26 is composed of a transverse tool bar 28 which operates as a main support for the cultivator tools. The inner end of the tool bar 28 is rigidly fixed to a fore-and-aft extending frame structure or channel member 30 by welding 31 and has at its inner end a cone-shaped lug 32. The lug 32 will normally extend through an opening 33 provided in the side frame member 14. The channel member 30 may be detachably connected to the side frame 14 by means of a bolt and nut combination 34.

Tool or shovel assemblies, as at 40, are mounted on the tool bar by means of a parallel linkage comprising upper and lower links 41, 42 interconnected at their rear ends by means of an upright bracket 43, and at their forward end by upright bracket 44. The connection between the links 41, 42 and the brackets 43, 44 are all pivotal about a transverse horizontal axis. The forward bracket 44 is fixed to the tool bar 28 in any suitable manner and the bracket 43 has its lower end fixed to the tool or shovel assembly 40. Also fixed to the tool bar 28 are upright bracket means 45 which support a transverse rockshaft 46. Lift linkage 47 extends from the rockshaft 46 to the lower parallel link 42 and operates in response to movement of the rockshaft 46 to raise or lower the shovel assembly 40. A rock arm 48 is mounted on the rockshaft 46 at one end and has its opposite end connected to a force-transmitting link or rod 49, the rear end of which is proximate to the operators station, not shown, on the tractor. By proper movement of the rod 49, the depth of penetration of the shovels on the tool assembly 40 may be regulated.

Details of the cultivator sections have been set forth in general terms since the exact nature of the cultivator section 26 is not of importance as concerns the present invention, and inasmuch as this type of section or others similar thereto are conventional and are well known to those familiar with the art. As mentioned previously details of the right cultivator section will be omitted entirely other than to note that the tool bar 29 is fixed to a right channel member 35 which in turn may be detachably connected to the right side frame 15 by the bolt and nut combination 36.

Each of the channel members 30, 35 are formed at their forward ends to curve inwardly around the forward end of the tractor with the flange or leg portions of the channel members 30, 35 being apertured at their inner ends to receive a vertical shaft 50. A lower strut 55 connects the outer end of the tool bar 28 to the channel member 30. A similar strut, not shown, connects the outer end of the tool bar 29 to the channel member 35. An upper strut member 56 connects the outer end of the tool bar 28 directly to the vertical shaft 50 and similarly the outer end of the right tool bar 29 is connected to the shaft 50 by an upper strut 57.

The vertical shaft 50 is connected to the forward end of the tractor body in the following manner. Plate members 58, 59 are fixed to the upper struts 56, 57 respectively and are consequently pivoted on the shaft 50. Fixed to the forward end of a tractor body 11 is a frame structure 62, at the forward end of which is fixed a rigid upright shaft or rod 63. The plates 58, 59 are provided with adjoining edges which have respective notches 64, 65 cooperate to grip the shaft or rod 63 when the upper struts 56, 57 are swung rearwardly. The struts 56, 57 are in their rearward position when the cultivator sections 26, 27 are positioned in their operating positions. The plates 58, 59 are held in the rod gripping position by means of a bracket member 66 having a depending portion 66a which will pass through apertures 67, 68 in the plates which are in vertical registered alignment when the notches 64, 65 surround the rod 63.

Figures 5, 6:
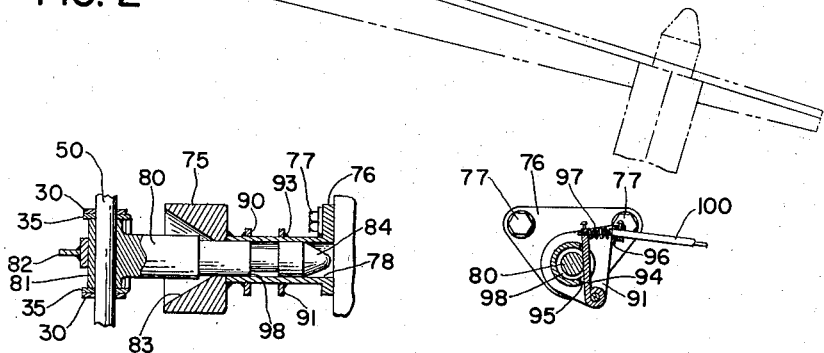
Fig. 5 is a sectional view taken along the lines 5—5 of Fig. 2.
Fig. 6 is a sectional view taken along the lines 6—6 of Fig. 2.

The lower end of the shaft 50 is fixed to the forward end of the tractor by means of a socket member 75. The socket member 75 is flanged, as at 76, and is bolted to the block 18 adjacent its forward surface 19 by means of bolts 77. The socket member 75 is hollowed as at 78 to receive the forward end of a bayonet type member 80 which is mounted on the shaft 50 by means of a hub portion 81. As shown in Fig. 5 the laterally extending leg or flange portions of the channel members 30, 35 overlap at the vertical shaft 50 with the flange of the member 35 lying adjacent to opposite ends of the hub 81. Welded to the front surface of the hub 81 is a T shaped rigid stop member 82, the opposite ends of which engage the channel members 30, 35 when the cultivator sections are at their laterally outermost positions. A forward end 83 of the hollow portion 78 is flared radially to a cone-shape and the rear end 84 of the bayonet member 80 is cone-shaped, both the cone-shaped ends 83, 84 cooperating to guide the member 80 into the socket member 75.

Referring specifically to Figs. 5 and 6, a pair of plate members 90, 91 are fixed, as by welding 93, to the outer surface of the socket member 75. The plates 90, 91 support between them a latch 94. The shell of the socket member 75 is broken away, as at 95, so as to permit the latch 94 to swing into the hollow portion 78 of the socket. The latch is pivotally mounted between the plates 90, 91 so that its upper end may swing inwardly or outwardly of the cut away section 95. A stop 96 connects the upper edges of the plates 90, 91 and operates as a brace for a spring 97 which biases the upper end of the latch 94. As may be seen clearly in Fig. 6, the latch 94 is therefore biased into the cut away section 95 of the member 75. The bayonet member 80 is provided with a circumferential slot 98 which may be positioned relative to the socket member 75 so that the latch 94 will seat itself in the slot, thereby locking the member 80 against movement relative to the socket member 75. The upper end of the latch 94 is connected to one end of a cable 100 which operates to move the latch 94 in and out of its locking position. The opposite end of the cable 100 may be positioned proximate to the operator's station on the tractor. An operator, remote from the locking or latching mechanism may therefore operate the latch.

Figure 3:
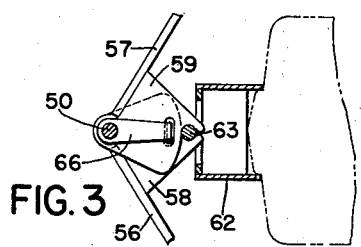
Fig. 3 is a sectional view taken along the lines 3—3 of Fig. 1.
Figure 4:
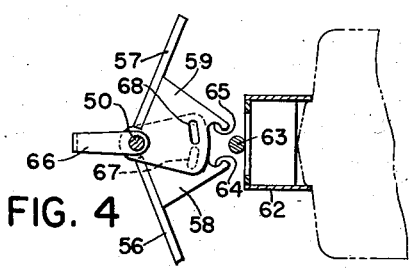
Fig. 4 is a view similar to Fig. 3 but showing a different position of the structure.
Figure 2:
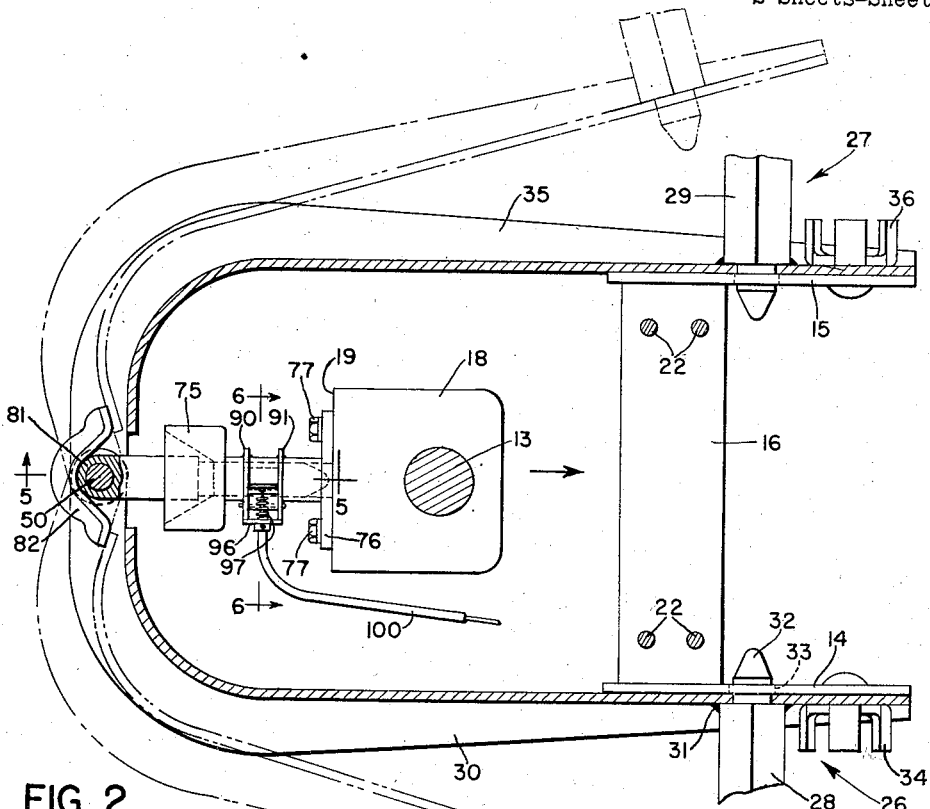
Fig. 2 is an enlarged sectional view taken along the lines 2—2 of Fig. 1.

Assuming for the moment that the cultivator is connected to the tractor i.e., the upward connection is as shown in Fig. 3, the lower connection between the shaft 50 and the tractor body is as shown in Figs. 2, 5, and 6, and the channel members 30, 35 are bolted to the frame structures 14, 15. In order to back the tractor from the cultivator the bolt and nut combination 34 and 36 must first be removed and the bracket 66 raised so that its depending portion 66a is removed from the apertures 67 and 68 to permit lateral swinging of the cultivator sections about the axis of the vertical shaft 50. With the bolt and nut combinations and the bracket 66 removed, the only restriction against relative fore-and-aft movement between the tractor and the cultivator is the latch 94 which holds the bayonet member 80 in the socket member 75. The line of resistance of the cultivator shovels is outward from the shaft 50, and consequently movement of the shaft 50 rearwardly will cause the cultivator shovels to swing outwardly. Therefore, rearward movement of the tractor will cause the shaft 50, since it is locked to the forward end of the tractor, to move rearwardly. Upon the cultivator sections 26, 27 swinging outwardly and clear of the tractor body, as shown in representative form in Fig. 2, the operator from his remote position at the operator's station can adjust the cable 100 to release the latch 94 from its seated position in the slot 98. At this point, the tractor may move rearwardly from the cultivator.

The cultivator may be mounted on the tractor in the following manner. The tractor is driven forwardly between the sections 26, 27, which are in their outwardly swung positions, until the bayonet member 80 seats itself in the socket member 75. Continued forward movement will cause the forward pivot means or shaft 50 to move forwardly with the resulting effect that the cultivator sections will swing inwardly. The plate members 58, 59 will close upon the rod 63 and the lug portions of the tool bars 28, 29 will move into their respective apertures in the side frame plates 14 and 15. The operator may then move the bracket member 66 so that its depending portion 66a will seat itself in the aperture 67, 68 and the bolt and nut combinations 34, 36 may be used to detachably connect the cultivator sections in their operating positions.

While only one form of the invention has been shown, it should be recognized that other variations and forms will unquestionably occur to those skilled in the art without departing from the basic principles herein disclosed. Therefore, while the details of the invention have been described for the purpose of clearly disclosing the principles of the invention, it is desired not to so limit or narrow the invention beyond that which is claimed.

What is claimed is:

1. Attachment means for mounting an implement having ground engageable portions on a tractor having a longitudinal extending tractor body with an operator's station thereon, comprising: structure forming vertical pivot means at the forward end of the tractor body; an elongated supporting structure connected to said implement and having a forward end mounted on the pivot means and extending from the pivot means rearwardly, said supporting structure thereby being adaptable to swing the implement between a position proximate to the tractor body and a position spacedly outward from the tractor body; means detachably connecting the frame structure to the tractor body while in its position proximate to the tractor body; a socket member fixed to the front end of the tractor and opening forwardly; a cooperating socket fitting member mounted on the structure forming the pivot means and extending rearwardly for seating in the socket member; a latch on the socket member operative to lock the socket member and socket fitting member together; and latch operating means extending from the latch and controllable from the operator's station for selective adjustment of the latch between locked and unlocked positions.

2. Attachment means for mounting a cultivator having ground engageable shovels on a tractor having a longitudinal extending tractor body with an operator's station thereon, said shovels creating a line of resistance to movement outward of the tractor body, said attachment means comprising: structure forming vertical pivot means at the forward end of the tractor body and inwardly of said line of resistance; an elongated supporting structure connected to said cultivator and having a forward end mounted on the pivot means and extending from the pivot means rearwardly, said supporting structure thereby being adaptable to swing the cultivator between an operative position proximate to the tractor body and an inoperative position spacedly outward from the tractor body; means for detachably connecting the frame structure to the tractor body when the cultivator is in operative position; a socket member fixed to the front end of the tractor and opening forwardly; a cooperating socket fitting member mounted on the structure forming the pivot means and extending rearwardly for seating in the socket member; a latch on the socket member operative to lock the socket member and socket fitting member together; and latch operating means extending from the latch and controllable from the operator's station for selective adjustment of the latch between locked and unlocked positions.

3. Attachment means for mounting a cultivator having ground engageable shovels on a tractor having a longitudinal extending tractor body with an operator's station thereon, said shovels creating a line of resistance to movement outward of the tractor body, said attachment means comprising: structure forming vertical pivot means at the forward end of the tractor body and inwardly of said line of resistance; an elongated supporting structure connected to said cultivator and having a forward end mounted on the pivot means and extending from the pivot means rearwardly, said supporting structure thereby being adaptable to swing the cultivator between an operative position proximate to the tractor body and an inoperative position spacedly outward from the tractor body; a socket member fixed to the front end of the tractor and opening forwardly; a cooperating socket fitting member mounted on the structure forming the pivot means and extending rearwardly for seating in the socket member; a latch on the socket member operative to lock the socket member and socket fitting member together to cause said pivot means to move fore-and-aft in response to fore-and-aft movement of the tractor, and unless otherwise restricted to thereby cause the cultivator to move between its operative and inoperative positions; latch operating means extending from the latch and controllable from the operator's station for selective adjustment of the latch between locked and unlocked positions; and means for detachably connecting the frame structure to the tractor body in its operative position.

References Cited in the file of this patent

UNITED STATES PATENTS 2,584,217    Morkoski _____ Feb. 5, 1952

FOREIGN PATENTS 724,355    Great Britain _____ of 1955